United States Patent Office 2,975,219
Patented Mar. 14, 1961

2,975,219

STABILIZATION OF CHLORINATED HYDROCARBONS WITH BORATE ESTERS

Fred W. Starks, Kenmore, N.Y., assignor to E. I. du Pont de Nemours and Company, Wilmington, Del., a corporation of Delaware No Drawing. Filed Nov. 29, 1957, Ser. No. 699,485

7 Claims. (Cl. 260—652.5)

This invention relates to chlorinated hydrocarbons stabilized by the addition thereto of small amounts of certain chemicals. It relates particularly to trichlorethylene and perchlorethylene.

The removal of grease films from metallic surfaces has been practiced for many years. Generally, the removal is accomplished by suspending the metal to be degreased in a boiling fat-solvent at atmospheric pressure. Suitable fat-solvents including particularly the liquid chlorinated hydrocarbons, of which trichlorethylene, perchlorethylene, tetrachlorethane and ethylene chloride are representative, but others may be utilized as well.

Trichlorethylene is probably the solvent most widely used in such operations. It is, however, seldom used in the pure state. Instead, stabilizing agents are usually added to prevent decomposition under the conditions of storage and utility. Light and oxygen, for example, decompose trichlorethylene very rapidly. Heat is also deleterious to this solvent and may accelerate the effects of light and oxygen. Unless precautions are taken, decomposition from heat, light and oxygen takes place under ordinary conditions. This type of decomposition may, therefore, be called "normal." Many compounds are known which, in trace amounts, will inhibit normal decomposition.

Another type of decomposition occurs when the workpiece to be degreased is made of aluminum or an aluminum alloy. The stabilizers effective to prevent decomposition by oxygen, light or heat are, in general, powerless against decomposition caused by aluminum. Resultant solvent degradation is made manifest by a rapid increase in acidity, discoloration of the solvent media and formation of black oils and tar. The same type of decomposition is also noted but in smaller degree in iron degreasing.

The causes of this metal induced decomposition are not exactly known. However, it is evident that whatever the mechanism, its initiation probably involves the production of hydrogen chloride. Hydrogen chloride may result from air oxidation of the chlorinated hydrocarbon, the decomposition of the chlorinated cutting oils frequently removed from metallic workpieces by degreasing or the catalytic effect of metal surfaces on these chlorinated compounds. This hydrogen chloride then reacts with the metal surface forming halide salts. When metallic aluminum or an aluminum alloy is being degreased, aluminum chloride is formed and this salt is an extremely active catalyst for the decomposition of chlorinated solvents, such as trichlorethylene and perchlorethylene. Solvent degradation is evidenced by a rapid rise in temperature and pronounced discoloration. In advanced stages, there is formed a black, tarry mass which may deposit on the workpiece. The same phenomenon may also be observed in iron degreasing where ferric chloride is a decomposition catalyst, but to a much lesser extent. In any event, it has heretofore been necessary to shut down operations and to remove non-volatiles and metal fines at frequent intervals. Such shut-downs entail additional labor, loss of production and loss of solvent. Hence, this metal induced decomposition detracts from the economics of the degreasing process.

A major object of this invention is, therefore, provision of a novel and useful method of stabilizing chlorinated hydrocarbons, particularly trichlorethylene and perchlorethylene.

Another object is provision of a method for stabilizing chlorinated hydrocarbons against decomposition induced by metals, aluminum in particular.

An additional object is provision of a chlorinated hydrocarbon stabilized against decomposition induced by aluminum.

The above-mentioned and still further objects may be accomplished in the spirit of this invention by dissolving a small amount of a neutral organic ester of certain inorganic acids in trichlorethylene or perchlorethylene. These esters are the borates, phosphates, sulfites and sulfonates in which each hydrogen atom of the parent acid has been replaced by an aliphatic or aromatic radical.

The esters of this invention are compounds possessing the type formulas shown below:

(1) Borates:

(2) Phosphates:

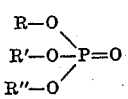

(3) Sulfites:

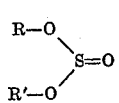

(4) Sulfonates:

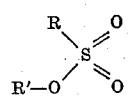

In the above formulas, R, R' and R'' may represent aliphatic or aromatic hydrocarbon radicals. R, R' and R'' may be the same or different. Also, R and R' may jointly constitute a divalent organic radical so that the ester is cyclic. The hydrocarbon radicals represented by R, R' and R'' may also carry substantially inert substituents, such as halogen atoms, hydroxyl groups, alkoxy groups, etc. which do not react with or decompose halogenated degreasing solvents or corrode metals. Such esters include trimethyl borate, triethyl borate, tributyl phosphate, tributoxyethyl phosphate, tricresyl phosphate, dimethyl sulfite, the cyclic sulfite of 1,1-dihydroxymethylcyclohexane, butyl p-toluene sulfonate, butyl benzene sulfonate, butyl p-chlorobenzene sulfonate and o-cresol p-toluene sulfonate. Esters which distill at or near the boiling point of the chlorinated hydrocarbon to be stabilized are desirable in some instances since, in this case, the stabilizer is not removed by distillation.

The quantity of ester required for effective stabilization of the chlorinated hydrocarbons is not very great, but will vary to some extent with the individual compound. In general between about 0.1% and 5% by weight of the additive is preferred. The esters of this invention are compatible with the stabilizing agents normally present in chlorinated hydrocarbons. Consequently, these esters are readily employed in combination with the stabilizers that inhibit normal decomposition.

There follow some examples which illustrate details of the invention. In these examples, the presence of aluminum chloride simulates stringent operating conditions in a metal degreaser. Stabilizers, which make it possible to reflux a trichlorethylene sample for several hours, are definitely effective since under these extreme conditions the unprotected solvent is almost completely decomposed by the time it reaches the reflux temperature. All pressures are those of the ambient atmosphere and all concentrations are in percent by weight.

*Example 1*

This example shows the decomposition of trichloroethylene in the absence of the stabilizers of this invention on exposure to aluminum chloride. The trichlorethylene employed in this and subsequent examples contained small concentrations of p-tertiary amyl phenol and triethylamine. The phenol derivative is commonly employed to prevent normal decomposition whereas the latter neutralizes small quantities of hydrogen chloride which may be formed. A 100 ml. sample of this stabilized trichloroethylene and 0.5 g. of anhydrous aluminum chloride were placed in a flask equipped with a reflux condenser and heated to boiling. Decomposition was extremely rapid and the sample was black, opaque and contained a large amount of black precipitate by the time it reached reflux temperature. It was then flooded with water to arrest the exothermic decomposition reaction.

*Example 2*

A 100 ml. sample of the trichlorethylene stock employed in Example 1 was additionally stabilized by the addition of 0.5% of trimethyl borate giving a colorless solution. This solution and 0.5 g. anhydrous aluminum chloride were then placed in flask equipped with a reflux condenser and boiled for 66.4 hours. When the refluxing commenced the material was clear and almost colorless. A slight amount of hydrogen chloride was initially evolved. After several hours, the solution became cloudy and a slight darkening in color became evident. When the refluxing had been completed, the sample was a cloudy dark liquid containing a small amount of black sediment.

*Example 3*

A 100 ml. of the trichlorethylene stock employed in the previous examples in which 0.5% of tributyl phosphate had been dissolved was placed in a flask with 0.5 g. aluminum chloride. The flask was equipped with a reflux condenser and the contents were refluxed for 66.9 hours. The boiling material, originally light and clear, became brown gradually on heating and the sample was a black cloudy liquid containing a little solid sediment when the reflux period was complete.

*Example 4*

Approximately 0.5% of tricresyl phosphate was dissolved in 100 ml. of the trichlorethylene stock. The solution was then treated with 0.5 g. of anhydrous aluminum chloride and heated to the boiling point in a flask equipped with a reflux condenser. The solution darkened rapidly and precipitated a black solid. After 5 minutes the solution was black and contained a large amount of sediment. The test was then discontinued. Stabilization, in this case, was relatively slight but the solution was definitely more stable than that of the control in Example 1.

*Example 5*

Approximately 0.5% of tributoxyethyl phosphate was dissolved in 100 ml. of the trichlorethylene stock employed in the previous examples. This solution was then placed in a flask with 0.5 g. aluminum chloride and refluxed for 66.4 hours. The solution rapidly became cloudy and brown in color. A small quantity of black sediment was formed and the solution was black and cloudy when the reflux period was complete.

*Example 6*

Approximately 0.5 g. of the cyclic sulfite of 1,1-dihydroxymethyl cyclohexane was dissolved in 100 ml. of the trichloroethylene stock solution employed in the previous examples. The structural formula of this sulfite is shown below:

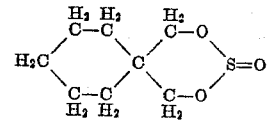

As in the previous examples the solution containing the ester was refluxed with 0.5 g. aluminum chloride. The reflux period was 72.5 hours. The solution developed a yellow color on reaching the reflux tempearture and a small amount of hydrogen chloride was evolved for a sort time. A small amount of black sediment was precipitated and the solution gradually darkened. At the end of the reflux period, the solution was black, cloudy and contained some black insoluble material.

*Example 7*

The testing procedure in this case was similar to that employed in the previous examples except that the ester stabilizer was 0.5 g. of n-butyl p-toluene sulfonate which dissolved readily in 100 ml. of the trichlorethylene stock. The reflux period was 72.4 hours.

On reaching reflux temperature, the liquid became light brown and cloudy, a moderate amount of hydrogen chloride was generated and a small quantity of black solid was precipitated. The liquid darkened on further heating and its final appearance was that of a dark brown cloudy liquid containing a little solid material.

*Example 8*

This test was similar to the previous ones except that 0.5 g. of butyl benzene sulfonate was dissolved in 100 ml. of the trichlorethylene stock. The reflux period was 73.1 hours.

On reaching the reflux temperature, the test solution was a light brown cloudy liquid containing a black solid precipitate. A small amount of hydrogen chloride was evolved. The liquid finally developed a dark green color and contained a moderate precipitate of black solid which stuck to the sides of the flask.

*Example 9*

This test was also similar to the previous ones except that the ester additive was o-cresyl p-toluene sulfonate. The reflux time was 72.8 hours.

On reaching the reflux temperature, the liquid assumed a light yellow color. On further heating the solution darkened somewhat and was a cloudy, deep red liquid when the reflux period was complete. A trace of black sediment was formed.

It should be noted that numerous variations are possible without departing from the spirit of this invention. Perchlorethylene may be employed in place of trichlorethylene as previously pointed out. This solvent is more stable with respect to aluminum chloride catalyzed decomposition and, consequently, requires less ester additive for protection. A wide variety of neutral organic esters of inorganic acids can be used as stabilizers provided they are soluble in the chlorinated solvent. Also, these stabilizers can be used in combination with the various other stabilizers used to protect chlorinated solvents against normal decomposition as well as the various acid accepters such as triethylamine, pyridine and other antacids.

Having described my invention, I claim:

1. The method of stabilizing a chlorinated hydrocarbon selected from the group consisting of trichlorethylene and perchlorethylene which comprises dissolving therein 0.5-5% by weight of a borate ester of the formula

wherein R, R' and R" are selected from the group consisting of lower alkyl radicals having 1 to 4 carbon atoms.

2. The method of stabilizing a chlorinated hydrocarbon selected from the group consisting of trichlorethylene and perchlorethylene which comprises dissolving therein 0.5-5% by weight of trimethyl borate.

3. The method of stabilizing a chlorinated hydrocarbon selected from the group consisting of trichlorethylene and perchlorethylene which comprises dissolving therein 0.5-5% by weight of triethyl borate.

4. A chlorinated hydrocarbon selected from the group consisting of trichlorethylene and perchlorethylene containing dissolved therein about 0.5-5% of a borate ester of the formula

where R, R' and R" represent lower alkyl radicals having 1 to 4 carbon atoms.

5. A chlorinated hydrocarbon selected from the group consisting of trichlorethylene and perchlorethylene containing dissolved therein about 0.5-5% of trimethyl borate.

6. A chlorinated hydrocarbon selected from the group consisting of trichlorethylene and perchlorethylene containing dissolved therein about 0.5-5% of triethyl borate.

7. Trichlorethylene containing dissolved therein 0.5 to 5% by weight of trimethyl borate as a stabilizer against decomposition induced by metals and metal salts.

References Cited in the file of this patent

UNITED STATES PATENTS

| | | |
|---|---|---|
| 2,298,638 | Prutton | Oct. 13, 1942 |
| 2,487,099 | Choban | Nov. 8, 1949 |
| 2,507,143 | Choban | May 9, 1950 |
| 2,550,953 | Young | June 12, 1951 |
| 2,630,442 | Church et al. | Mar. 3, 1953 |
| 2,803,663 | Kohn | Aug. 20, 1957 |
| 2,885,377 | Knowles et al. | May 5, 1959 |